(12) United States Patent
Rattunde

(10) Patent No.: US 7,886,456 B2
(45) Date of Patent: Feb. 15, 2011

(54) MEASURING DEVICE FOR MULTIPLE TUBE SECTIONS

(76) Inventor: Ulrich Rattunde, Dorfstrasse 48a, Bentwisch (DE) D-19322

( * ) Notice: Subject to any disclaimer, the term of this patent is extended or adjusted under 35 U.S.C. 154(b) by 247 days.

(21) Appl. No.: 12/227,883

(22) PCT Filed: May 30, 2007

(86) PCT No.: PCT/DE2007/000968
§ 371 (c)(1),
(2), (4) Date: Dec. 1, 2008

(87) PCT Pub. No.: WO2007/137567
PCT Pub. Date: Dec. 6, 2007

(65) Prior Publication Data
US 2009/0126215 A1 May 21, 2009

(30) Foreign Application Priority Data
May 30, 2006 (DE) .................. 10 2006 025 506

(51) Int. Cl.
G01B 3/00 (2006.01)
(52) U.S. Cl. .......................................... 33/832; 33/641
(58) Field of Classification Search .................. 33/832, 33/641
See application file for complete search history.

(56) References Cited
U.S. PATENT DOCUMENTS
3,789,509 A * 2/1974 Harkness ..................... 33/641
4,926,559 A * 5/1990 Knabel ......................... 33/832

FOREIGN PATENT DOCUMENTS
DE    1056857    5/1959
DE    1968351    9/1967
DE    1798424    10/1972

* cited by examiner

Primary Examiner—G. Bradley Bennett
Assistant Examiner—Tania C Courson
(74) Attorney, Agent, or Firm—Varnum Riddering Schmidt & Howlett LLP

(57) ABSTRACT

The invention concerns a measuring device for the simultaneous examination (testing) of lengths of at least essentially equal length sections (20) of a rod shaped profile material, whereby two opposite measuring sides (30, 40) can be positioned between at least two sections (20) in longitudinal direction (L) next to each other and can be positioned on an acceptance (10) in a specified bundle and a travel device (90) for at least one of the two measuring sides (30, 40) by which the distance between the two measuring sides can be reduced and is characterized by that at least one of the two measuring sides (30, 40) at a minimum shows one in longitudinal direction (L) aligned relative to a measuring side (30, 40) moveable measuring plunger (60) is shown and one section (20) after the reduction of the distance between the two measuring sides (30, 40) touches with one end exactly one of the measuring plungers (60) and with the other end touches the other measuring side (40).

13 Claims, 2 Drawing Sheets

MEASURING DEVICE FOR MULTIPLE TUBE SECTIONS

RELATED APPLICATIONS

Figure 1:
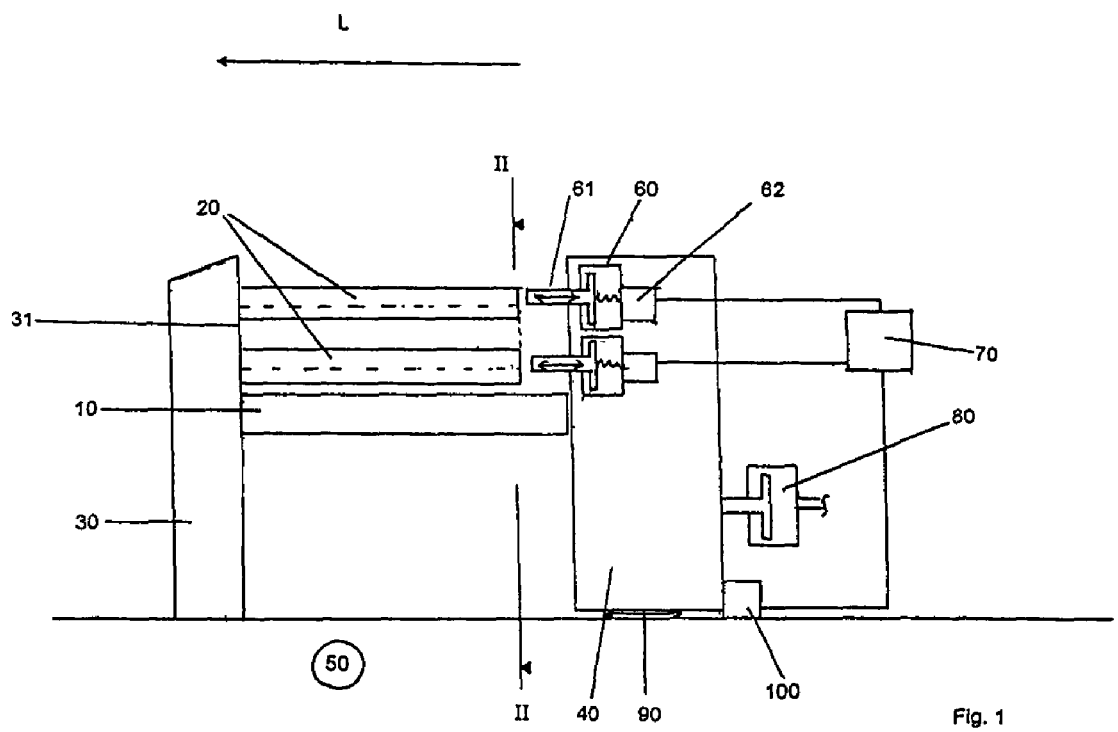

This is a National Phase application based on International Application Serial No. PCT/DE2007/000968 filed May 30, 2007, which claims priority of German patent application 10 2006 025 506.2 filed May 30, 2006.

The invention concerns a measuring device and a process for the simultaneous examination of the lengths of at least two, cut-off sections of a rod shaped profile material which are essentially of the same lengths.

Measuring devices and processes for the measuring of sections of a rod shaped profile material are especially used as components in integrated sawing equipment/machines. Modern integrated sawing machines enable the processing of tubes through a multiple number of processing steps that are carried out one after another. For rod shaped profile material, especially tubes, it is known to at first cut the material into sections and then to process these further by chamfering, washing and deburring.

With the known integrated sawing machine, the problem is the high precision requirement of the cut-off tube sections with the large number of pieces to be measured in a certain time. It is necessary to cut the tubes to size, especially metal tubes, with an accuracy of 0.1 mm and to adhere to this precision with a probability of 99.99%. At the same time, with an integrated sawing machine, several thousand sections per hour have to be cut off. The cut-off sections are measured by a measuring device. This measuring examination also must occur while maintaining the required accuracy for the large number of pieces.

It is an object of the invention to make a measuring device available, which allows the testing of the lengths of cut-off sections of a rod shaped profile material, as well as make a process available which enables the testing of the lengths of the sections of a rod shaped profile material.

In regards to the device, the task is fulfilled by a measuring device with the characteristics of claim 1.

The invention makes use of the fact that for the attainment of a sufficiently high measuring speed, a measuring device will be made available which allows the simultaneous measurement of at least 2, and preferably 4, exact cut-off sections, especially of a tube in one measuring cycle.

Between the two opposite measuring sides are at least two sections in longitudinal direction positioned on an acceptance in a specified way of stacked bundles. The acceptance can be positioned and built in such a way that a certain number of sections are, at such loading step and by force of gravity, stacked in the same relative arrangement to the same bundle.

On the insides of the measuring sides facing each other, a measuring plunger is arranged. Each side can be assigned exactly to a measuring stamp, so that at the same time all sections of the bundle can measured simultaneously.

According to the invention, the relative distance of the two measuring sides can be changed by way of a traversing unit. It is preferable that one of the measuring sides, or if need be both measuring sides, can be moveable relative to one another. Before carrying out the actual examinations of the two sections, the two measuring sides must be moved away from each other and during the examination, the two measuring sides must be moved toward each other in such a way that their two insides take on exactly the distance of the length of the longest section of the bundle to be tested. After the measurement, the two measuring sides must be moved away from each other. By this step, the loading of the acceptance with the bundles will be easier.

At least one of the two measuring sides includes at least a measuring plunger in longitudinal direction, which is arranged on the inside of the measuring side, so that after the movement, gets in exact contact with exactly one cut-off end, so that a section can be tested through one measuring stamp. With a measuring plunger, slight differences of the lengths of the sections can be measured to the area of 0.01 mm. With contact, a measurement occurs with touching. Touchless measurement can take place with, for example, a measurement by a scanning beam.

Advantageously, the number of the measuring plungers conforms to the number of the cut-off sections of a bundle to be tested. This way it is possible to test each positioned section on the acceptance by its length with an exactly assigned measuring stamp. The relative arrangement of the measuring plunger is here constant and constructive and is determined by the arrangement of the sections in the bundle.

The measuring plungers are all preferably provided on the inside of one measuring side and which additionally is moveable. At best short cabling is used with this. The travel direction can also be provided on one measuring side and with this a short cabling is used. For the determination of the lengths of the moving distance, a measuring system is envisioned on one of the measuring sides in the embodiment of this invention.

One end of a section presses during the measurement against one of the measuring plungers, so that several sections can be measured individually at the same time.

Each of these measuring plungers can include a measuring head, which is designated for contact with the section and is designed to move relative to the measuring side on which it is arranged. The measuring head can be moved flexibly back and forth in longitudinal direction in the measuring stamp. The movement will be measured exactly by an inductive position measuring system in the inside of the measuring stamp. The described measuring plungers have already been tested and have a long service life.

Preferably, in combination with the described measuring head, the inside of the other measuring side in the area above the acceptance is formed as a complete straight surface. It serves as a stop for the other end of the sections cut to length. The other measuring side is preferably fixed. By the fixed and simple construction of the other measuring side, the measurement is especially exact.

Each of the sections, in this preferred further development of the invention, is clamped between the two measuring sides during the measurement because with one end it touches the straight surface and with the other end it touches one of the flexibly moveable measuring heads under light pressure. Advantageously, the measurement will be unaffected by outside disturbances, as for an example, shocks.

Several measuring plungers are arranged on the inside of the preferred one measuring side, so that after shortening the distance of the two measuring sides from each other, each section is touching, with its other section end, the plane surface and, with its cut-off end, is touching an exact assigned measuring stamp. Here it is excluded that one section end has contact with two or even more measuring plungers and with it prevents an individual measurement. Preferably, the stable one-to-one arrangement is reached by a prismatic formed acceptance in conjunction with a specified diameter lateral to the longitudinal direction of the cut-off section. The prismatic formed acceptance, in its cross-section that is vertical to the longitudinal direction is somewhat formed like a funnel, so that if a multiple number of tube sections are accidentally put into the acceptance, they always stack themselves in the same way in rhombus form. Preferably the four measuring plungers are then arranged at the corners of a shifted rhombus form. The four measuring plungers allow the individual measurement of four positioned tube sections on a prismatic acceptance with a specified angle.

In an especially preferred design form of the invention, each of the measuring plungers, as well as the measuring system, are connected to an evaluation unit. In this evaluation unit, rated values of the lengths and allowable tolerances of the lengths of the sections are stored. The evaluation unit is connected with a controllable sorting device by which the bundle, with exceeding of only one tolerance of the measured sections can be sorted out, and with the adherence of all tolerances will be sorted in. In the evaluation unit the regular rated/actual comparison of the lengths takes place. According to the invention a specific time saving is in the fact that the total bundle of the tube sections not only are measured at the same time, but also are sorted out if needed, as soon as only one measurement is outside the tolerance. This is notably seldom the case. In the cutting process described herein, approximately 99.994% of the cut-off sections are within the tolerance. The bundle is sorted out in one unit. It needs no further treatment. With this however, tube sections are sorted out with still allowable lengths in it. However it has been shown that the sorting out of a defective bundle in total takes more time and creates costs, than the complete disposal of a total bundle. Also, additional equipment or controls have to be made available. This would hardly be profitable for the described small number of defective cuts.

In regards to this process, the task is fulfilled by the characteristics of claim 11.

According to the invention, in the acceptance between two opposing measuring sides, two sections of a rod shaped profile material, especially tube sections out of metal, are positioned in the longitudinal direction and in a specified way in stacked bundles. Here the sections arrange themselves by gravity in the same relative position to the bundle.

After positioning of the bundle, at least one of the two measuring sides in the direction of the other measuring sides, are moved in a travel device and the length of the travel distance is measured with a measuring system. The one measuring side is moved so far until one measuring stamp, aligned in the longitudinal direction, is arranged on one of the insides of the measuring side and has contact with a section end and preferably touching it.

After the contact of each of the measuring plungers with respectively one of the section ends has been made, whereby each section is assigned exactly to a measuring stamp, then the actual length measuring is carried out, meaning the measuring values of the measuring plungers and of the measuring system in the form of measuring data is transferred to an evaluation unit. In the evaluation unit, the data of the rated value of the lengths and the data of the tolerance of the lengths of the sections are stored and are then compared with the measuring data. For this, the moveable measuring side is connected to the measuring system so that the travel distance of the measuring side, opposite the fixed measuring side, is measured and with it allows the calculation of difference with the measured values of the individual measuring plungers and a length measurement of each section. If the tolerance is exceeded by one of the measuring values, the total bundle is sorted out. When all sections are adhering to the tolerances, the bundle is sorted in. The evaluation unit is connected via a control with a sorting device, especially in the form of a gripping arm, which sorts in or sorts out the bundles into the appropriate container.

The invention is described with an application example in two figures. Shown here:

FIG. 1. A schematic side view of a measuring device according to the invention.

Figure 2:
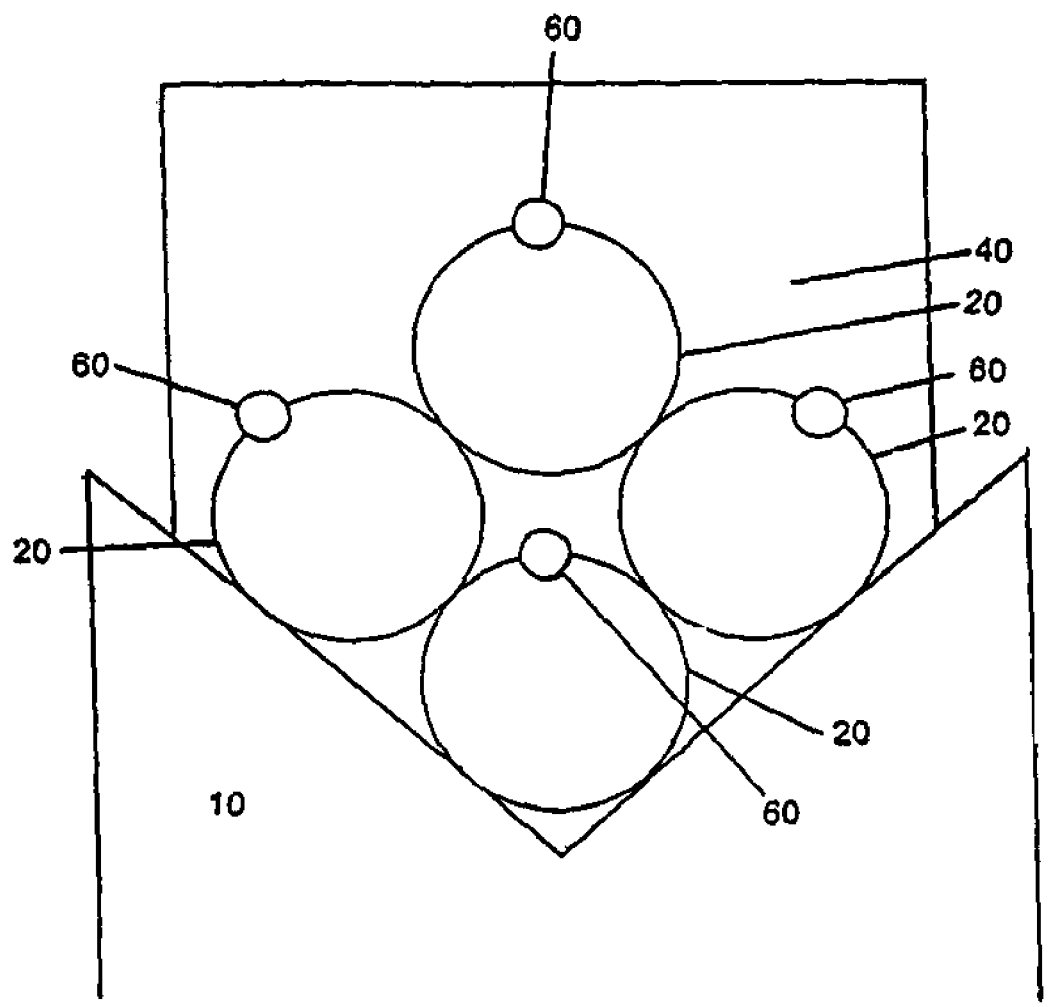

FIG. 2. A schematic sectional view along the lines II-II in FIG. 1.

For the cut-off of tube sections 20 of a metal tube, an integrated tube cutting machine is planned. The cut-off tube sections 20 are subject to a post treatment by chamfering, deburring and washing. The tube sections 20, with a length of, for example 0.5 m, have to fulfill a tolerance of 0.1 mm and a process capability of $C_{pk}$=1.33. That means more than 99.994% of all parts are then within the tolerance.

The tube sections 20 show essentially, after the cut-off, the same lengths. Because each cutting process is subject to slight inaccuracies, the length of the section after cut-off has to be tested in order to warrant the above mentioned standards.

The examination according to the invention is carried out in the measuring device in FIG. 1. The measuring device is arranged at the end of the processing distance of the tube cutting machine. By way of a (not shown) gripping arm, the measuring device can be loaded and unloaded with tube sections 20. The tube sections 20 can also be loaded and unloaded bundled in fours for time saving.

The measuring device shows a prismatic acceptance 10 for essentially four of equal length tube sections 20. The shown measuring device in FIG. 1 serves for the testing of the lengths of the cut-off tube sections 20. For this, a bundle of four essentially equal length tube sections 20 is positioned in cross section perpendicular to the shown planes in FIG. 1 to the prismatic acceptance 10 with the gripping arms. The four tube lengths 20 are stacked in longitudinal direction L on the acceptance 10 as bundles. The stacked arrangement of the tube sections 20 within the bundle of four is the same with each measuring cycle. Because the angle of the prismatic acceptance, as well as the diameter of the tube section, are synchronized to each other, this leads to the same positioning of the tube sections 20 within the bundle even with less exact loading of the acceptance 10 with four tube sections.

The measuring device shows a fixed measuring side 30 opposite to the ground 50 or to the fixed tube cutting machine, also shows a moveable measuring side 40 opposite to the ground 50. Above the prismatic acceptance 10, four measuring plungers 60 are positioned at the moveable measuring side 40. Every one of these measuring plungers 60 shows a moveable elastic measuring head 61 in longitudinal direction L. The depths of indentation of the measuring head 61 in the measuring plunger 60 is measured exactly, by way of an inductive distance measuring system 62 in measuring plunger 60, to 0.001 mm. Each of these measuring plungers 60 is connected with an evaluation unit 70 via an electric cable.

Before the bundle of the tube sections 20 is put on the acceptance 10, the moveable measuring side 40 is moved away from the fixed measuring side 30. The distance between the fixed and moveable measuring sides is increased in the direction of the loading. Then the bundle is put on the prismatic support 10 and the moveable measuring side 50 again is moved to the fixed measuring side 30. By reducing the distance of the two measuring sides 30, 40 from each other, the four tube sections 20 are aligned. The moveable measuring side 40 is moved so far to the fixed measuring side 30 until all four measuring heads 61 have contact with, respectively, one end of a tube section 20 and another end of each tube section 20 is aligned to a level stop 31 of the fixed measuring side 30 and the other ends are aligned with each other.

The moveable measuring side 50 is connected with a drive in the form of a pneumatic cylinder 80. The pneumatic cylinder 80 moves the moveable measuring plunger 40 on a guide. The traveled distance can be measured by way of a measuring system 100, arranged to the moveable measuring side 40. The measuring system 100 is electrically connected with the evaluation unit 70 as well. The combination of the measuring values of the measuring system 100 and the four measuring plungers 60 allows the calculation of the exact lengths of each of the tube sections 20 which are located in the acceptance 10.

In the evaluation unit 70, rated values of the lengths of the tube section 20 as well as allowed tolerance values are stored by which the rated lengths may exceed or fall short. In the evaluation unit 70, the four measured tube lengths are compared with the stored reference (rated) values. With exceeding or falling short of only one of the four tolerance intervals of a tube section 20, the total bundle is sorted out. When all four measurements are within the tolerance interval, the bundle is sorted in and is transferred to further processing.

FIG. 2 shows in a sectional view the geometric arrangement of the four measuring plungers 60 on one inside of the moveable measuring side 40. The four measuring plungers 60 are facing the stop 31 of the fixed measuring side 30. The arrangement of the four measuring plungers 60 are chosen in such a way that the four tube sections 20, stacked on the prismatic acceptance 10, have contact with exactly one measuring plunger 60 when the moveable measuring side 40 is moved in the direction to the fixed measuring side 30. By this it is possible to test the lengths of a certain tube section 20 by the assigned measuring plunger 60. The measuring system according to the invention allows the carrying out of 2500 measuring cycles per hour, meaning 10,000 cut-off tube sections can be measured per hour. The examination is exceptionally quick and nevertheless very dependable.

The invention claimed is:

1. Measuring device for the simultaneous examination of lengths of at least two essentially same lengths cut-off sections 20 of a rod shaped profile material, characterized by two opposite of another measuring sides (30, 40) between which the at least two sections (20) in longitudinal direction (L) next to each other and in a specified manner stacked bundle on acceptance (10) are positioned and a travel device (90) for at least one of the two measuring sides (30, 40) by which the distance between the two measuring sides can be reduced and is thereby characterized that a measuring side (30, 40) shows at least one measuring plunger (60) oriented in longitudinal direction (L) and each of the at least two sections (20) after reducing the distance between the two measuring sides (30, 40) makes contact with one end and exactly one of the measuring plungers (60).

2. Measuring device according to claim 1, characterized by at least one measuring plunger (60) is moveable relative to a measuring side (30, 40).

3. Measuring device according to claim 1, characterized by the number of the measuring plunger (60) conforms exactly to the number of sections (20) of a bundle.

4. Measuring device according to claim 1, characterized by at least two sections (20) are assigned to a measuring plunger (60) and each section (20) touches one of the measuring plungers (60) after reducing the distance between the two measuring sides (30, 40).

5. Measuring device according to claim 1, characterized by exactly one of the two measuring sides (30) is fixed in position and at least one measuring plunger (60) is arranged to a moveable measuring side (40).

6. Measuring device according to claim 1, characterized by that during a measurement each end of a section (20) touches either one of the measuring plungers (60) or an inside of a measuring side (30, 40).

7. Measuring device according to claim 6, characterized by the measuring plunger (60) is arranged in such a way to an inside wall of a measuring side (30, 40) that a face side of a tube wall of a stacked bundle touches exactly one of the measuring plungers (60) during the measurement.

8. Measuring device according to claim 1, characterized by the acceptance (10) is formed in a prism shape and is designed for the acceptance of four sections (20) at the same time which are arranged in a cross section vertically and in a rhombus shaped way to the longitudinal direction and one of the measuring sides (30, 40) shows four measuring plungers (60) which are essentially arranged at the corners of a rhombus and the tube rhombuses are offset to each other.

9. Measuring device according to claim 1, characterized by that on one of the moveable measuring sides (40) a measuring system, for the recording of the lengths of the moveable distance, is planned and on each of the measuring plungers (60) a relative movement between the measuring stamp (60) and the assigned measuring side (30, 40) a distance measuring system is provided.

10. Measuring device according to claim 9, characterized by each of the distance measuring systems of the measuring plunger (60) and the measuring system (100) is connected to an evaluation unit (70) and in the evaluation unit (70) rated values of lengths and tolerances of the lengths of the sections (20) are stored and characterized by an accessible sorting device, by which the total bundle, when exceeding a tolerance, can be sorted out and when adhering to all tolerances will be sorted in.

11. Process for the simultaneous testing of the lengths of at least two essential same length sections (20) of a rod shaped profile material according to one of the above claims, by which at least two sections (20) in longitudinal direction (L) next to each other and in a specified way in a bundle are stacked on an acceptance (10) between two opposite measuring sides (30, 40), the distance between the two measuring sides (30, 40) by way of a travel device (90) for at least one of the two measuring sides (30, 40) is reduced until each of the at least two sections (20) with exactly one end makes contact to a measuring plunger (60) oriented in longitudinal direction (L) moveable relative to and arranged at a measuring side (30,40) and with the other end makes contact with the other measuring side (40) and at the same time measuring data from at least two measuring plungers (60) is evaluated for the at least two sections (20).

12. Process according to claim 11, characterized by the measuring data of a measuring system (100) for a travel distance of the measuring side (30, 40) is determined and the measuring data from the distance measuring system of at least two measuring stamps (60) are determined.

13. Process according to claim 11, characterized by the measuring data is fed into an evaluation unit (70), the stored data of the rated value of the lengths and the tolerances of the lengths of each section (20) are compared with the measuring data in the evaluation unit (70), is directed into a sorting device and the total bundle is sorted out when exceeding the tolerance of a section (20) and is sorted in when adhering to all tolerances.

* * * * *